April 26, 1927.
C. T. WEYMANN
1,625,923
OPERATING AND LOCKING DEVICE FOR OSCILLATING PANELS
Filed Nov. 5, 1926
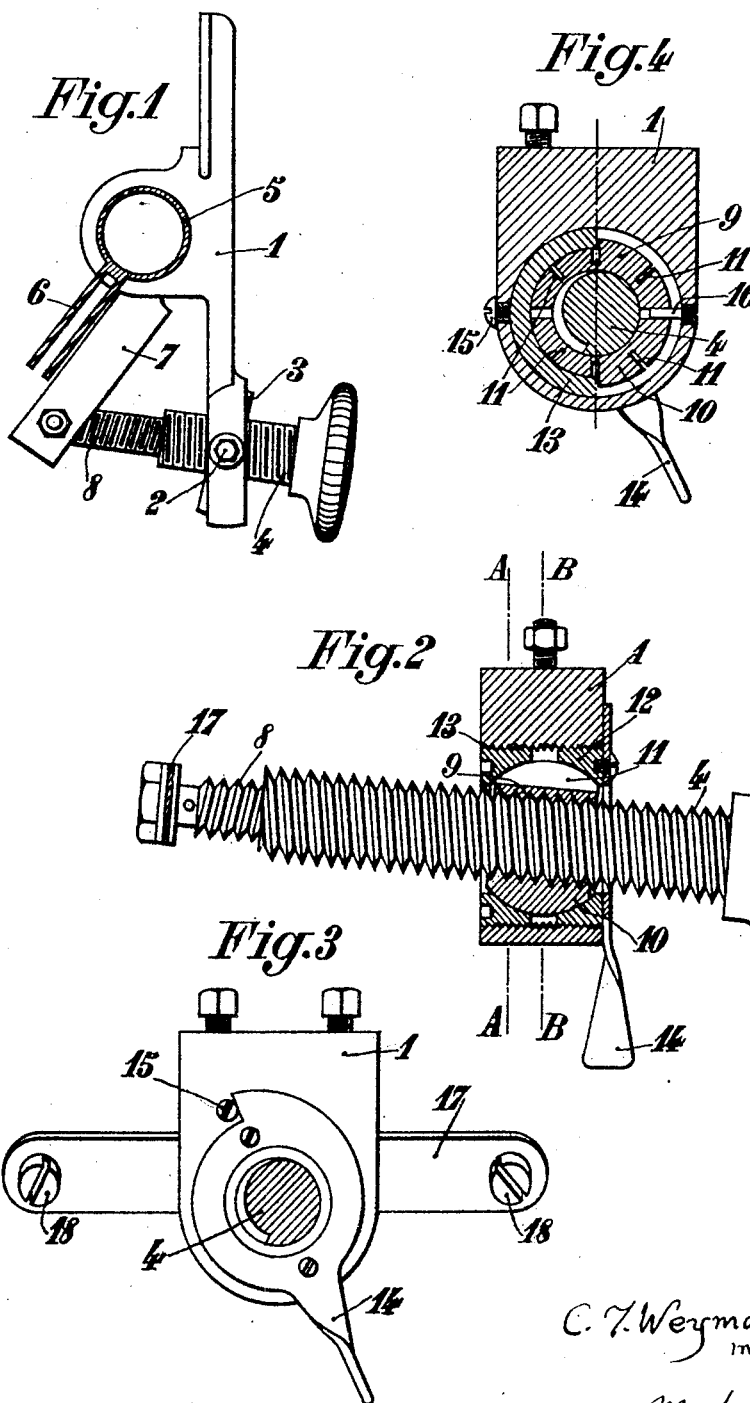

UNITED STATES PATENT OFFICE.

CHARLES TERRES WEYMANN, OF PARIS, FRANCE.

OPERATING AND LOCKING DEVICE FOR OSCILLATING PANELS.

Application filed November 5, 1926, Serial No. 146,452, and in France November 16, 1925.

In the United States Patent No. 1,594,109, dated 27th July, 1926, has been described an operating device for pivoting panels in which the stress (which must determine the opening of the panel and which is generated by the variation of length of a telescopic system of differential screws) acts by thrust between a fixed point, constituted by the nut of the differential device, and a movable point, situated on the oscillating panel, below its pivoting axis. It has been noted that, in practice, at the end of a certain time of use, the threads of the outer screw and the inner screw threads of the nut receiving it, are subjected to a certain wear so that the device has some play, this diminishing the efficiency of the locking in position of the entire device.

The present invention has for object an improvement in this operating and locking device for oscillating panels. This improvement substantially consists in providing the nut of the differential screw device with a locking device allowing, at will, either to release the screw so as to be able to move it, by rotation, relatively to the said nut, or to lock the screw with the nut in which it fits, so that the said screw forms a block with the nut. This locking device can, moreover, be combined with a wear compensating device, so that whatever may be the value existing between the thread of the screw and the inner screw threads of the nut, the locking device, which allows, at will, to render them rigid together or not, can assume its functions and play its part without necessitating the modification of its control, of its adjustment, or of the amplitude of its displacements.

In the accompanying drawing and by way of example:

Fig. 1 is an elevation of the operating and locking device described and illustrated in the United States Patent No. 1,594,109 above mentioned.

Fig. 2 is a vertical section of the improved device constructed in accordance with the present invention.

Fig. 3 is a side view seen from the rear of Fig. 2.

Fig. 4 shows two vertical sections made according to lines A—A and B—B of Fig. 2.

The device described in the United States Patent No. 1,594,109 above mentioned is essentially composed (Fig. 1): of a fixed support 1 carrying, on the one hand, the joint 2 of a bearing 3 acting as a nut for one of the differential screws, on the other hand, the joint 5 of the pivoting panel 6, on which is rigidly secured a lever 7 connected to the other screw 8 of the differential device, this screw 8 cooperating with the inner screw threads of the outer screw 4 which passes through the bearing 3 acting as a nut.

The improvement forming the subject-matter of the present invention consists in providing the above mentioned device with a positive locking mechanism permitting, at will, to lock or unlock the outer screw 4 in its bearing 3, so as to either permit their relative displacements, or to immobilize them relatively to each other against any accidental displacement. With this locking device can be combined a compensating device for the wear taking place between the screw threads in contact, this device being adapted to maintain invariable the adjustment of the above mentioned locking device.

However, it is obvious that the locking device or the wear compensating device might be applied, one or the other, and independently from each other to the operating device for the oscillating panels of Fig. 1.

In the example illustrated, the internally screw threaded bearing 3 in which moves the screw 4 is constituted by an expansible member, that is to say such that the parts constituting it, under the effect of any external action, can be moved towards the screw 4, so as to embrace its screw threads and to determine its immobilization, or on the contrary, can be moved away from the said screw threads so as to permit the displacements of the screw 4.

For that purpose, this expansible member can be composed, as illustrated, of two half-balls 9—10 internally screw threaded. These half-balls 9—10 are grooved at 11, as shown in Figs. 2—4, so that the spherical segments thus obtained can be resiliently moved towards or away from each other, when a pressure is exerted or when this pressure is released on the whole of the bearing thus obtained.

These half-balls 9—10 are arranged between two spherical cups 12—13 which fit in the fixed support 1. One of the cups 13 forms a fixed bearing, whilst the other cup 14 can be longitudinally moved by screwing it in the corresponding inner screw threads of the support 1. This operation is effected by imparting, by means of the handle 14, angular displacements to the cup 12. These displacements have for effect either to move the spherical segments constituting the bearing towards each other, so as to render it rigid (by locking it) with the screw 4, or to release the latter for permitting its displacements relatively to the said bearing.

A fixed abutment 15 limits the displacement of the driving device 14 in the direction for unlocking the cup 12.

The cup 13 can be fixed or it can be adjusted in the support 1. In the latter case it can constitute a device for compensating the wear and play taking place between the screw threads of the screw 4 and of the nut 9—10. It will be understood that if such a wear takes place, the operation of the above mentioned locking device is modified in that it becomes necessary to have recourse to a greater translation of the cup 12 for obtaining the same clamping action. This modifies, in consequence, the value of angular displacement to which this locking system must be subjected and, consequently, the adjustment of the whole of this device.

If some play takes place through wear, this constant adjustment is however maintained by unlocking the locking device 14—12 and by screwing, in the support 1, the cup 13 until the inner screw threads of the half-balls 9—10 bear upon the threads of the screw 4.

After adjustment, the bearing 13 is held against any rotation by a locking screw 15. Likewise, a stop claw 16 (Fig. 4) fits between the two halves 9—10 of the bearing, for immobilizing the latter against any angular displacement.

The second screw 8 of the differential device can be directly secured on the control lever 7 of the panel, or can come in engagement with the mounting of the latter by means of a supple connection. In the case illustrated (Figs. 1–3) the screw 8 is fastened in the middle portion of an arched spring leaf 17, the ends of which are secured on the mounting of the panel (Fig. 3), by means of screws 18 for instance.

The means described, concerning the locking, in their application to the nut of the screw 4, might also be used for the latter, considered as constituting the nut of the inner screw 8. By way of example, it is indicated that, for that purpose, the screw 4 might be provided with longitudinal grooves, similar to the grooves 11, the said grooves giving to this screw the properties of an expansible member.

What I claim as my invention and desire to secure by Letters Patent is:

1. A device for operating and locking an oscillating panel pivoted on a fixed frame comprising in combination a screw, means for connecting this screw to the pivoting panel so that it can freely turn on itself and transmit to the said panel its displacements in translation, a nut for the said screw, the said nut being pivoted on the fixed frame so as to be capable of rotating about an axis parallel to the axis of rotation of the panel, means for causing the said screw to rotate, means for locking this screw in position.

2. A device for operating and locking an oscillating panel pivoted on a fixed frame comprising in combination a screw, means for connecting this screw to the pivoting panel so that it can freely turn on itself and transmit to the said panel its displacements in translation, a nut for the said screw, the said nut being pivoted on the fixed frame so as to be capable of rotating about an axis parallel to the axis of rotation of the panel, means for causing the said screw to rotate, means for locking this screw in position, means for compensating the relative wear of the screw and of the nut.

3. In a device as claimed in claim 1, a nut cut in two parts according to a diametral plane and arranged between two cups, one of which is screwed in the frame, so that the tightening of the cups tends to move the two halves of the nut towards each other.

4. In device as claimed in claim 2, a nut cut in two parts according to a diametral plane, the said nut having a spherical shape and radial slots, two cups screwed in the frame and so arranged that their tightening tends to move the two halves of the nut towards each other, a handle secured on one of the cups, an abutment for this handle.

5. A device for operating and locking an oscillating panel pivoted on a fixed frame, comprising in combination a system of telescopic differential screws, means for securing the inner screw to the pivoting panel, a nut for the outer screw, the said nut being pivoted on the fixed frame so as to be capable of rotating about an axis parallel to the axis of rotation of the panel, means for causing the said screw to rotate, means for locking this screw in position.

6. A device for operating and locking an oscillating panel pivoted on a fixed frame, comprising in combination a system of telescopic differential screws; means for securing the inner screw to the pivoting panel, a nut for the outer screw, the said nut being pivoted on the fixed frame so as to be capable of rotating about an axis parallel to the axis of rotation of the panel, means for causing the said screw to rotate, means for locking this screw in position, means for compensating the wear of the screw and of the nut.

7. In a device as claimed in claim 5, a nut cut in two parts according to a diametral plane and arranged between two cups, one of which is screwed in the frame, so that the tightening of the cups tends to move the two halves of the nut towards each other.

as claimed in claim 6, a nut cut in two parts according to a diametral plane, the said nut having a spherical shape and radial slots, two cups screwed in the frame and so arranged that their tightening tends to move the two halves of the nut towards each other, a handle secured on one of the cups, an abutment for this handle.

9. A device for operating and locking an oscillating panel pivoted on a fixed frame, comprising in combination a system of telescopic differential screws, means for securing the inner screw to a supple member belonging to the pivoting panel, a nut for the outer screw, the said nut being pivoted on the fixed frame so as to be capable of rotating about an axis parallel to the axis of rotation of the panel, means for causing the said screw to rotate, means for locking this screw in position.

10. A device for operating and locking an oscillating panel pivoted on a fixed frame, comprising in combination a system of telescopic differential screws, means for securing the inner screw to the central portion of a spring leaf the ends of which are secured to the pivoting panel, a nut for the outer screw, the said nut being pivoted on the fixed frame so as to be capable of rotating about an axis parallel to the axis of rotation of the panel, means for causing the said screw to rotate, means for locking this screw in position.

In testimony whereof I have signed my name to this specification.

CHARLES TERRES WEYMANN.